Dec. 30, 1930.  J. J. STAMPEN  1,786,786
TEAT CUP
Filed May 14, 1927
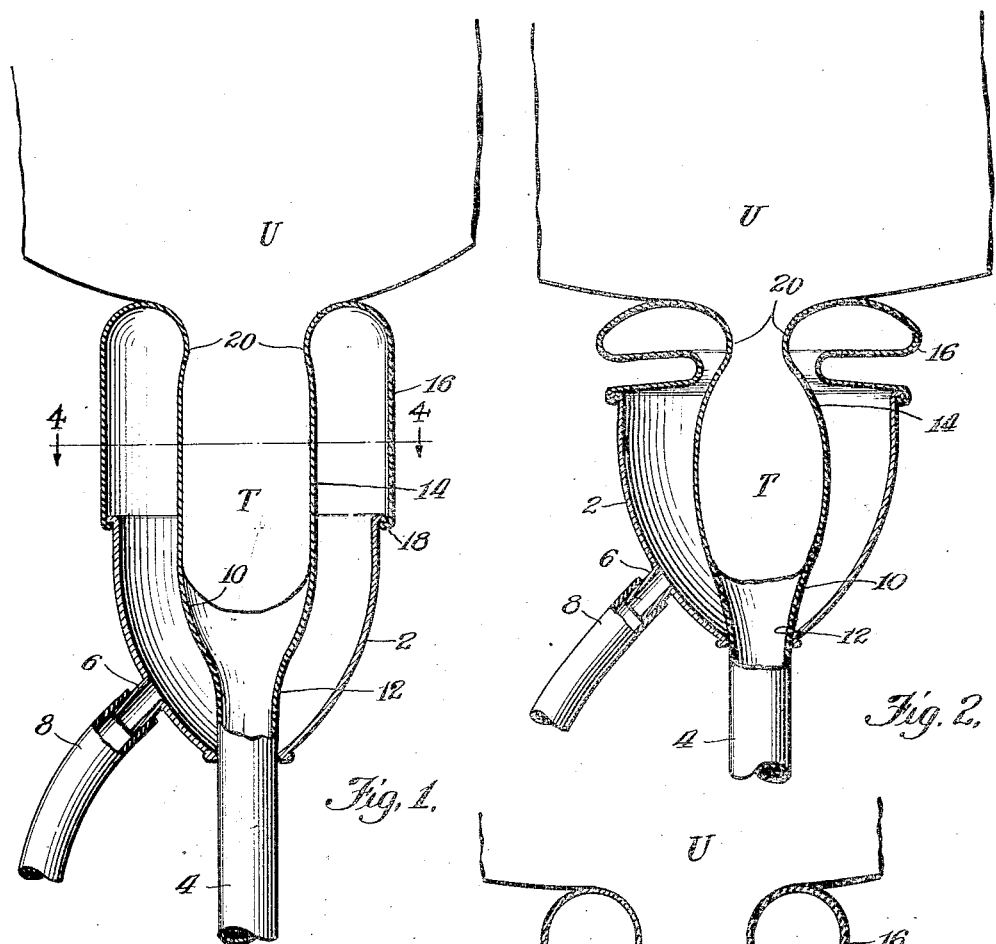
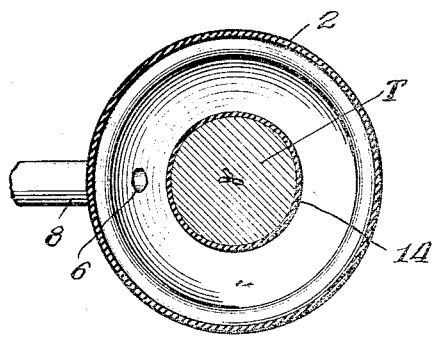
Inventor
Jacob J. Stampen
By Cheever & Cox
attys Patented Dec. 30, 1930

1,786,786

UNITED STATES PATENT OFFICE

JACOB J. STAMPEN, OF CHICAGO, ILLINOIS, ASSIGNOR TO BABSON MANUFACTURING CORPORATION, OF CHICAGO, ILLINOIS, A CORPORATION OF ILLINOIS

TEAT CUP

Application filed May 14, 1927. Serial No. 191,288.

My invention relates to teat cups for milking machines.

One of the objects of my invention is to provide a teat cup capable both of manipulating the teat and agitating or massaging the udder whereby the cow is induced more quickly to release the milk.

Another object is to provide a construction wherein during each cycle of operations the teat will be initially constricted at or near its base and a squeezing action will pass thence downwardly as a sort of stripping action and in faithful simulation of an efficient manual milking operation.

These and other objects of my invention will be apparent from a perusal of the following specification when taken in connection with the accompanying drawings wherein, Figure 1 is a sectional view of my improved teat cup showing the state wherein there is no vacuum.

Figure 2 is a view showing the collapsed upper portion of the flexible member.

Figure 3 is a view showing the atmospheric air pressing in on the central portion of the teat cup.

Figure 4 is a horizontal section taken substantially along the line 4—4 in Figure 1.

Referring now to the drawings in detail my teat cup comprises the shell 2 which is shown in the drawings as preferably somewhat conical being formed with an open end having a slightly curled flange at its open mouth, and being provided with a central opening at the opposite end adapted to receive the milk tube 4 which is well known in the art connects with the milk pail the interior of which is under a slight vacuum. At one side the shell 2 is provided with an outstanding tubular projection 6 which connects with the usual pulsator tube 8. The inflation 10 is flexible being preferably made of rubber, and as shown clearly in the drawings is formed at one end with a restricted tubular portion 12 which connects with the upper part of the milk tube 4 as it projects through the bottom opening of the shell 2. The inflation comprises a central portion 14 for accommodating the teat T and an external portion 16 connected to the central portion at the top or outer end of the central portion, the external portion 16 being folded over, upwardly and downwardly so that when the teat cup is first placed upon the teat the the external portion 16 will lie substantially coaxial with the central portion 14 to provide a collapsible air space between these portions. The outer lower end 18 of the external portion 16 is arranged to overlap and be connected to the curled or flanged upper edge of the shell 2 and form therewith in any suitable manner an air tight connection. It will be noted that an appreciable part of the central and external walls of the inflation are above the upper edge of the shell 2, thus providing a flexible and collapsible diaphragmic member which not only is adapted to grip and manipulate the upper portion of the teat but also to manipulate the lower portion of the udder U. By particular reference to Fig. 1 wherein the teat cup is shown in the position in which it has just been placed upon the teat, it will be noticed that due to the fact that the external portion 16 folds upwardly over the central portion 14 there is a tendency of the central portion to be constricted at the points 20 which lie near the base of the teat. If desirable, the flexible portion may be preformed to produce this slight constriction at this point. This constricted portion is arranged so that during the squeezing operation due to the entry of atmospheric pressure through the pulsator pipe 8 into the shell 2 the pressure will take place first at this constricted zone 20 so that the squeezing of the teat will operate progressively downward toward the free end of the teat as a sort of stripping action, thereby in a manner faithfully simulating an efficient manual milking operation.

That portion of the flexible collapsible member which lies above the upper edge of the shell 2 is constructed and arranged not only to manipulate the upper portion of the teat but is also adapted during the pulsations to automatically and gently massage or agitate the lower portion of the udder. By special reference to Figs. 1, 2 and 3 and particularly Figs. 2 and 3, which represent the extreme states or conditions of the teat, it will be seen that in Fig. 3 a minimum amount of the inflation member is in contact with the base of the udder, whereas in Fig. 2 which represents the completely collapsed condition, the maximum amount of the inflation is in contact with the basal portion of the udder. This automatic massaging or agitating action is directly brought about by the somewhat vertical reciprocation of the teat cup toward and from the basal portion of the udder and which reciprocation in turn is due to the alternate collapse and contraction of the central portion 14 of the teat cup.

As is well known this expansion and contraction of the teat cup 14 is brought about by the pulsator connecting tube 8. For instance when atmospheric air is admitted to the shell the squeezing operation takes place so that the central portion 14 of the teat cup is somewhat elongated as shown in Fig. 3. In this position the surrounding shell 2 is at its lowermost point with relation to the teat or basal portion of the udder, next during the rarefaction period central portion 14 of the teat will pass from the intermediate conditions shown in Fig. 1 to that shape shown in Fig. 2 which represents a completely collapsed condition of the teat. During this operation of the cycle of operation the teat cup will move upwardly and the upper portions of the central and external walls 14 and 16 respectively of the teat cup will fold outwardly to the position shown in Fig. 2 to provide a sort of massaging or agitating action against the lower portion of the udder at the base of the teat. This portion of the cycle will in turn be followed by a downward reciprocation movement of the shell 2 and the consequent manipulation of the central portion of the teat under the squeezing action of atmospheric air so that the teat will again come to the condition shown in Fig. 3. This cycle of operation will be repeated during the milking operation so that there will be an alternate contraction and expansion of the central portion 14 of the teat cup, and a simultaneous contraction and outward expansion of the upper flexible portions 14 and 16 of the inflation which latter operation will operate to gently massage or agitate the udder so that the cow will release the milk into the teat. This last massaging action is somewhat in simulation of the calf butting the udder of the cow as it sucks the milk from the teat. The foregoing described massaging action may also be due in a measure to a slight movement of the teat cup as a whole along the teat and toward and away from the basal portion of the udder. For instance just at the moment that the space between the shell 2 and the central portion 14 of the inflation is devoid of vacuum, there is a tendency for the teat cup and its milk and pulsator tubes to drop down slightly on the teat and then when the vacuum comes on again the inflation will grip the teat and pull the teat cup upwardly toward the basal portion of the udder. This causes the upper flexible and collapsible portion of the inflation to butt against the udder thereby creating the massaging or agitating action. It will be apparent that the central portion 14 of the inflation collapses and expands in a vertical plane whereas the upper and external portions 16 of the inflation collapse and expand in a horizontal plane. The former action is the teat manipulating action and the latter is the udder massaging or butting action.

Having thus described my invention what I claim as new and desire to secure by Letters Patent is:

1. A teat cup of approximately conical shape having a lower central opening and an upper open edge, a milk tube projecting through the lower opening, a pulsator tube connected with the interior of the shell and a flexible inflation having a lower tubular portion connecting with the upper portion of the milk tube, said inflation including a cylindrical central portion having its lower portion lying within the shell, said central portion having a flexible tubular extension of appreciably larger diameter folding outwardly and over the upper central portion of the inflation with the free edge of the enlarged portion connected in an air tight manner to the upper end of the shell and projecting appreciably above said upper end of the shell to form a collapsible member adapted to massage the udder.

2. A teat cup having a shell and an inflation, the latter being spaced from the former to form an air chamber and having an upper extension providing a collapsible member for massaging the udder, said inflation being capable of expansion and contraction, in a horizontal direction and said extension being expandable in a vertical direction when the air pressure within said chamber is varied.

3. A teat cup having a shell and an inflation, forming a closed compartment, said inflation having a flexible portion extending above the shell and attached to the shell, the remainder of the inflation being adapted to shift axially to produce a massaging action on the udder when the flexible portion expands and collapses.

4. A teat cup having a shell and an inflation, the latter having a collapsible central portion adapted to manipulate the teat and having a collapsible external portion adapted to manipulate or massage the udder, said central portion being axially movable with respect to the shell upon the collapse and extension of the external portion.

5. A teat cup comprising a shell and an inflation, said inflation having a central portion arranged to grip a teat, a lower portion extending through an aperture in the shell, the shell being slidably mounted with respect to said lower portion and an upper flexible portion forming a collapsible wall extending between the teat gripping portion and the upper edge of the shell, said flexible portion permitting the shell to move longitudinally upon the lower portion of the inflation.

6. A teat cup having a shell and an inflation, the inflation forming an inner portion adapted to collapse radially upon a teat, said portion being housed movably within the shell, and a flexible outer portion forming a collapsible wall extending between the upper end of the inner portion and the upper edge of the shell, said outer portion being adapted to collapse axially to permit relative axial movement of the shell with respect to the inner portion of the inflation, whereby to cause the shell and the collapsible wall to butt into the udder in simulation of a feeding calf.

7. A teat cup having a shell and an inflation, the latter being attached to the shell at its upper end and having a body extending through the shell, said shell being free to move longitudinally with respect to the lower portions of the inflation and said inflation having a flexible portion at its upper end extending appreciably above the shell, whereby to permit of the relative movement of the inflation within the shell and to promote the agitation of the udder by the collapse and extension of the flexible portion.

8. A teat cup having a shell and an inflation, comprising two flexible portions, the upper of which extends above the shell and is attached thereto at its upper edge and the other of which extends through the shell, the same being free to move axially within the shell, said shell being provided with means for pulsating the air pressure therein whereby to expand and contract the inflation and cause the same to move relatively within the shell to thereby simulate a butting action upon the udder.

9. A teat cup having a shell and an inflation attached at its upper end only to the shell, said inflation having a portion extending within the shell and adapted to manipulate a teat and a collapsible external flexible portion extending above the shell whereby to permit the teat manipulating portion to move axially of the shell upon the collapse and expansion of the flexible external portion so as to permit the flexible portion to strike a butting blow upon the udder adjacent the teat in order to facilitate the milking operation.

In witness whereof, I have hereunto subscribed my name.

JACOB J. STAMPEN.